US009654188B2

(12) United States Patent
Nieman (10) Patent No.: US 9,654,188 B2
(45) Date of Patent: May 16, 2017

(54) SCALABLE MASSIVE MIMO (71) Applicant: NATIONAL INSTRUMENTS CORPORATION, Austin, TX (US)

(72) Inventor: Karl F. Nieman, Austin, TX (US)

(73) Assignee: NATIONAL INSTRUMENTS CORPORATION, Austin, TX (US)

(*) Notice: Subject to any disclaimer, the term of this patent is extended or adjusted under 35 U.S.C. 154(b) by 0 days.

(21) Appl. No.: 14/871,997

(22) Filed: Sep. 30, 2015

(65) Prior Publication Data

US 2017/0093466 A1    Mar. 30, 2017

(51) Int. Cl.
  H04B 7/04       (2006.01)
  H04B 7/0413    (2017.01)
  H04L 25/02     (2006.01)

(52) U.S. Cl.
  CPC ....... H04B 7/0413 (2013.01); H04L 25/0202 (2013.01)

(58) Field of Classification Search
  CPC .................................................. H04B 7/0413
  USPC ........................................................ 375/267
  See application file for complete search history.

(56) References Cited

U.S. PATENT DOCUMENTS

| 8,756,565 B2 | 6/2014 | Graf |
| 2010/0246457 A1 | 9/2010 | Zhou |
| 2011/0235744 A1 | 9/2011 | Ketchum |
| 2013/0219355 A1 | 8/2013 | Brown |
| 2013/0219360 A1 | 8/2013 | Graf |
| 2015/0049824 A1 | 2/2015 | Kim |
| 2015/0195019 A1* | 7/2015 | Nagata ................. H04B 7/0491 375/267 |
| 2015/0288439 A1* | 10/2015 | Kim ..................... H04B 7/0469 375/295 |

(Continued)

FOREIGN PATENT DOCUMENTS

| EP | 2234442 A2 | 9/2010 |
| EP | 2278731 A2 | 1/2011 |

(Continued)

OTHER PUBLICATIONS

CPRI Specification V6.0; Aug. 30, 2013; pp. 1-128; Ericsson AB, Huawei Technologies Co. Ltd, NEC Corporation, Alcatel Lucent, and Nokia Siemens Networks GmbH & Co. KG. (128 pages).

*Primary Examiner* — Michael Neff
(74) *Attorney, Agent, or Firm* — Meyertons Hood Kivlin Kowert & Goetzel, P.C.; Jeffrey C. Hood; Michael B. Davis (57) ABSTRACT

Techniques are disclosed relating to massive MIMO communications. In some embodiments, a base station is configured to dynamically adjust the number of processing elements used for MIMO signal estimation (e.g., the number of MIMO RX chains used for parallel processing). In some embodiments, the number of processing elements may be based on the number of antennas currently being used, the number of spatial streams, interconnect throughput thresholds, sampling rate, etc. In some embodiments, the base station includes configurable MIMO cores configured to dynamically switch between MIMO signal estimation techniques, e.g., on a per-symbol basis. In some embodiments, the base station includes configurable linear decoders configured to separately multiply input matrices and combine or refrain from combining the results based on the number of antennas and/or processing elements currently in use.

20 Claims, 9 Drawing Sheets

(56) References Cited

U.S. PATENT DOCUMENTS

2016/0037444 A1\* 2/2016 Jung .................... H04W 48/16
  370/338

FOREIGN PATENT DOCUMENTS

EP    2577798 B1    4/2013
WO   WO 2013133645 A1   12/2013

\* cited by examiner

SCALABLE MASSIVE MIMO

BACKGROUND

Technical Field

This disclosure relates to wireless communication systems and more particularly to multiple input, multiple output (MIMO) communications.

Description of the Related Art

Modern communication systems rely upon multiple antennas at the transmitter and/or receiver to enhance link performance. This class of techniques, known as multiple input, multiple output (MIMO) exploits the spatial dimension by employing spatial encoding and/or decoding. Massive MIMO is an exciting area of 5G wireless research that promises significant gains that offer the ability to accommodate more users, at higher data rates, with better reliability, while consuming less power. Conventional MIMO base stations typically use six or eight antennas in a sectorized topology, but massive MIMO base stations utilize more than eight antennas (and sometimes as many as 128, 256, or more) and massive MIMO user equipment devices (UEs) may typically utilize around eight antennas. Using the larger number of antenna elements, massive MIMO reduces power in a given channel by focusing the energy to targeted mobile users using precoding techniques. By directing the wireless energy to specific users, the power in channel is reduced and, at the same time, interference to other users is decreased.

The introduction of so many antenna elements, however, introduces several system challenges not encountered in conventional networks. For example, processing and synchronization requirements for massive MIMO may be difficult to meet using conventional systems. Therefore both test systems for prototyping different MIMO techniques and production MIMO systems configured to utilize these techniques are desired.

SUMMARY

Techniques are disclosed relating to massive MIMO communications. In some embodiments, a base station is configured to dynamically adjust the number of processing elements used for MIMO signal estimation (e.g., the number of MIMO RX chains used for parallel processing). In some embodiments, the base station is configured to scale from only a few antennas to as many as 128, 256, etc. In some embodiments, the number of processing elements may be based on the number of antennas currently being used, the number of spatial streams, interconnect throughput thresholds, sampling rates, etc. In some embodiments, the base station includes MIMO processing cores that are configured to dynamically switch between MIMO signal estimation techniques, e.g., on a per-symbol basis. In some embodiments, the base station includes configurable linear decoders configured to separately multiply input matrices and combine (or refrain from combining) the results based on the number of antennas and/or processing elements currently in use.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Various units, circuits, or other components may be described or claimed as "configured to" perform a task or tasks. In such contexts, "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112(f) for that unit/circuit/component.

DETAILED DESCRIPTION

Figure 1:
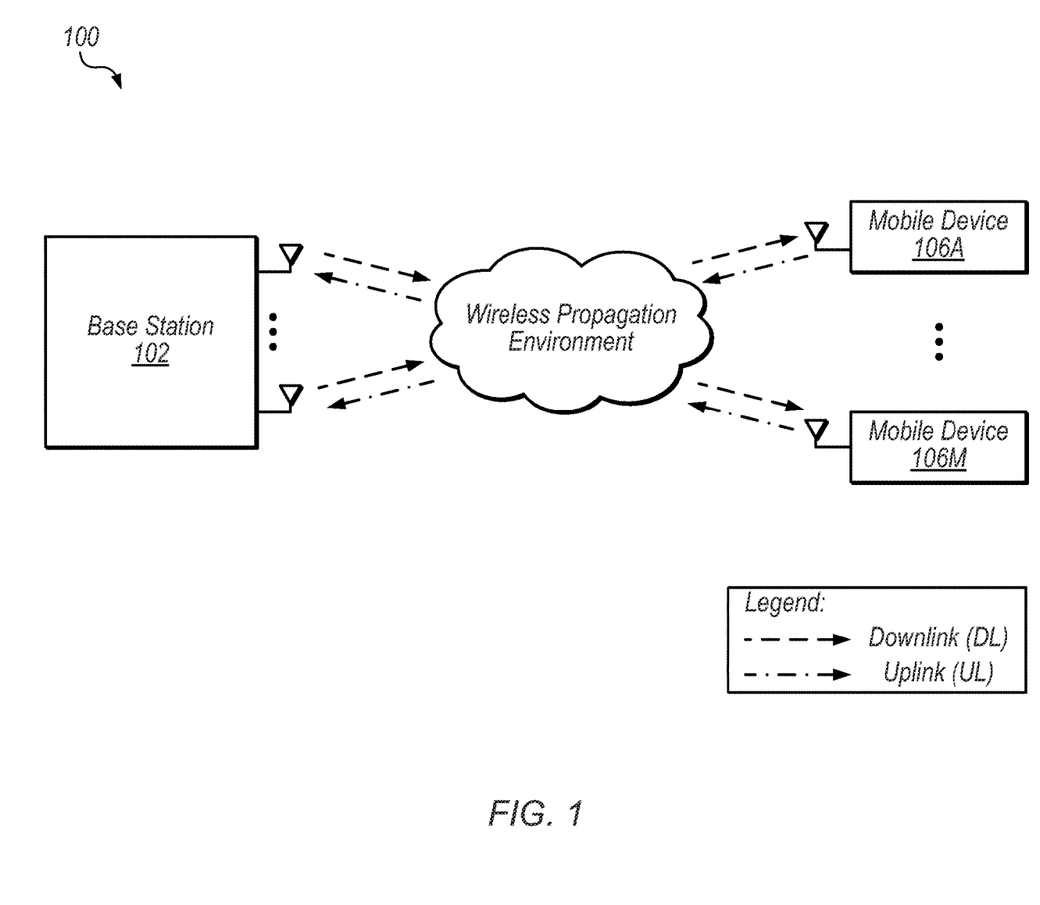
FIG. 1 is a block diagram illustrating MIMO communications in a wireless propagation environment, according to some embodiments.
Figure 2:
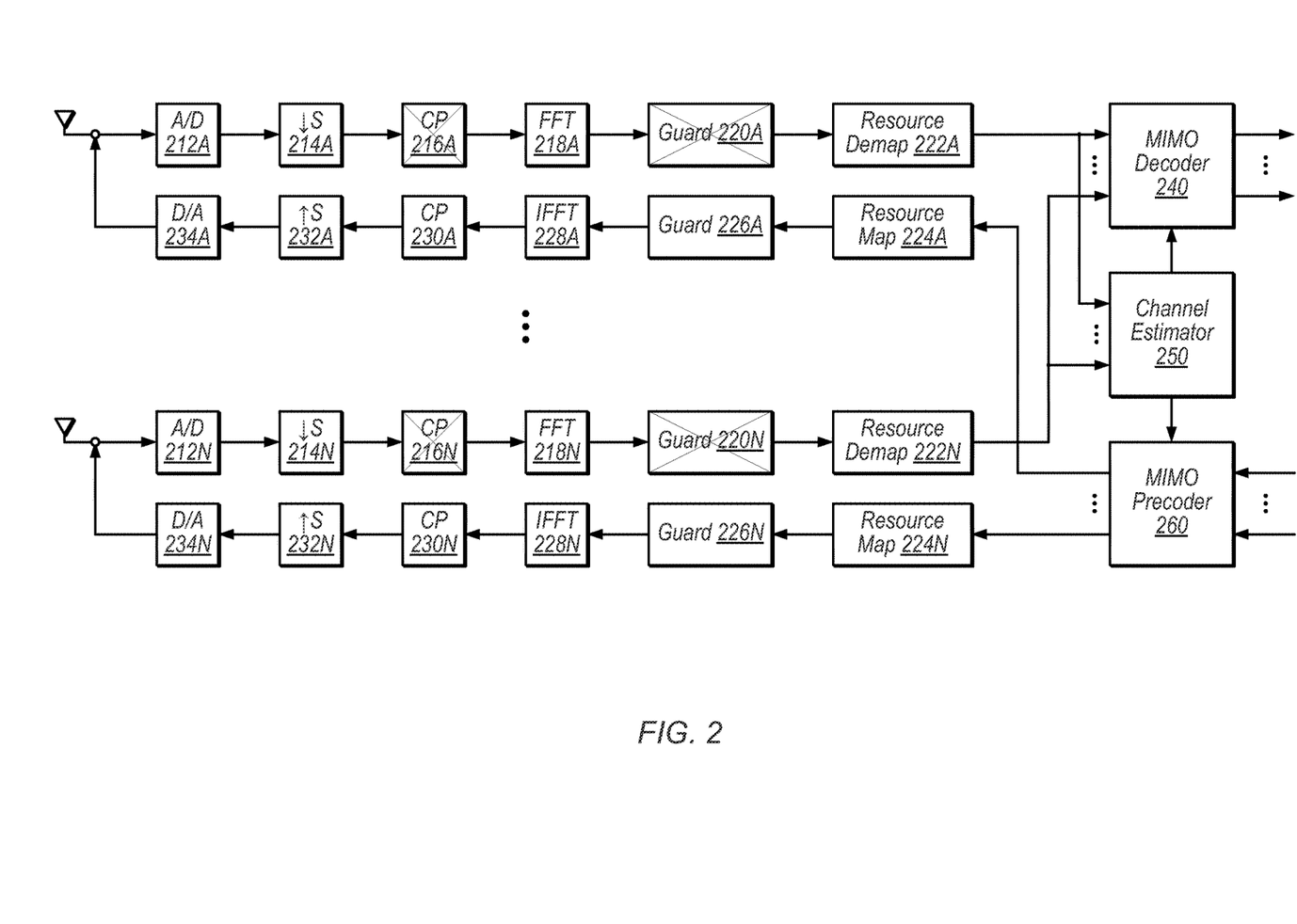
FIG. 2 is a block diagram illustrating exemplary send and receive processing chains for reciprocity-based MIMO, according to some embodiments.

This disclosure initially describes, with reference to FIGS. 1-2, an overview of exemplary multiple-input multiple-output (MIMO) communications and processing. Generally, MIMO technology attempts to exploit multipath propagation to increase radio capacity, performance, and/or range using multiple transmit and receive antennas. An exemplary massively scalable MIMO base station is discussed with reference to FIGS. 3-10. In some embodiments, a system is configured as a versatile, flexible, and scalable massive MIMO platform for real-time, two-way communication. The disclosed systems and techniques may be used in production environments and/or in test environments.

Acronyms

The following acronyms are used in the present disclosure.

3GPP: Third Generation Partnership Project
3GPP2: Third Generation Partnership Project 2
BER: Bit Error Rate
CDMA: Code Division Multiple Access CPTR: Common Periodic Time Reference
DDR: Double Data Rate
DL: Downlink
EVM: Error Vector Magnitude
FFT: Fast Fourier Transform
FPGA: Field Programmable Gate Array
GSM: Global System for Mobile Communications
LTE: Long Term Evolution
MIMO: Multiple Input Multiple Output
MRT: Maximum Radio Transmission
OFDM: Orthogonal Frequency-Division Multiplexing
PER: Packet Error Rate
PCIe: Peripheral Component Interconnect Express
PLMN: Public Land Mobile Network
PXIe: PCI eXtensions for Instrumentation Express
RAT: Radio Access Technology
RF: Radio Frequency
RX: Receive
SDR: Software Defined Radio
SRP: Software Radio Peripheral
TX: Transmit
UE: User Equipment
UL: Uplink
UMTS: Universal Mobile Telecommunications System
WCDMA: Wideband Code Division Multiple Access
ZF: Zero Forcing Terms The following is a glossary of terms used in the present application:

Memory Medium—Any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Computer System—any of various types of computing or processing systems, including a personal computer system (PC), mainframe computer system, workstation, network appliance, Internet appliance, personal digital assistant (PDA), personal communication device, smart phone, television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, PDAs, portable Internet devices, music players, data storage devices, other handheld devices, as well as wearable devices such as wrist-watches, headphones, pendants, earpieces, etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements that are capable of performing a function in a device, such as a user equipment or a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

MIMO Example and Theory

FIG. 1 shows an exemplary MIMO system 100 that includes base station 102 and M mobile devices 106A-106M (which may also be referred to as user equipment devices or UEs 106A-106M). In the illustrated embodiment, base station 102 includes N antennas configured to transmit and receive data with mobile devices 106 using time-division duplexing (TDD). In other embodiments, other transmission techniques may be used including frequency-division duplexing (FDD), for example.

In system 100, mobile devices 106 may concurrently communicate with base station 102 via wireless propagation environment. The paths taken by different signals may vary among the mobile devices, e.g., based on their location in the environment. Therefore, using MIMO techniques to precode signals transmitted by the base station, for example, may greatly improve overall radio capacity, performance, and/or range. Thus, base station 102 may allocate multiple antennas (e.g., as many as ten or more in some massive MIMO systems) to a given mobile device 10. To configure allocation, in some embodiments, mobile devices may concurrently transmit a known pattern to the base station in a particular time or frequency slot. Base station 102 may compare the pattern across a number of antennas to determine the unique channel characteristics to each spatially diverse path for the different UEs. Subsequently, the base station may apply the inverse of channel characteristic parameters as a form of precoding, such that each mobile device 106 receives its intended messages.

In some embodiments, base station 102 is configured to exploit the reciprocity of the channel between base station 102 and a given mobile device 106 by using uplink channel conditions (for communications from one or more of the mobile devices 106 to the base station 102) to configure downlink transmissions (from the base station 102 to at least one of the mobile devices 106). Received downlink and uplink signals, y and z, may be modeled as:

$$y = Hd + w \quad (1)$$

$$z = Gu + v \quad (2)$$

where d and u represent transmitted downlink and uplink signals respectively, H represents a complex-valued downlink channel matrix of M×N dimensions, G represents a complex-valued uplink channel matrix of N×M dimensions, and w and v represent additive noise that is independent on each signal path.

If the transition from uplink to downlink is sufficiently fast (e.g., within the channel coherence time), G approaches the conjugate transpose of H, H*. This concept is referred to as channel reciprocity.

Various options are available for precoding the downlink signal (d). For example, linear precoding may generate d as:

$$d = Fx$$

Where F is a downlink precoder applied to signals $x_N$ intended for each of N users of mobile devices 106. Typically, the precoder is formed using channel estimates. Common precoders include zero forcing (ZF) and minimum mean squared error (MMSE). In some massive MIMO embodiments with a large number of antennas, the columns of H may become nearly orthogonal and maximum ratio transmission (MRT) precoding may be applied. This may simplify precoding while maintaining a maximum sum rate relative to other precoding methods. In various embodiments, however, any of various appropriate precoding techniques may be implemented.

Speaking generally, MIMO techniques may increase capacity, performance, and/or range of wireless communications. Although various embodiments are discussed herein in the context of cellular communications, these embodiments are not intended to limit the scope of the present disclosure. Rather, the disclosed techniques may be used in various wireless communication contexts, such as WIFI, for example.

FIG. 2 shows exemplary send and receive chains for reciprocity-based MIMO for two antennas, which may be included in MIMO base station 102, for example. In the illustrated embodiment, analog-to-digital (A/D) converters 212A-N demodulate and digitize received uplink signals from RF. Down-samplers 214A-N down-sample the digital samples to a desired sampling rate, e.g., that is some fraction of the A/D sampling rate. Subsequently, units 216A-N, 218A-N, 220A-N, and 222A-N perform OFDM signal processing, including removing the cyclic prefix (CP), performing a Fast Fourier Transform (FFT) after serial-to-parallel conversion, removing guard subcarriers, and de-allocating uplink data and pilots to the resource map. Base station 102 may then pass pilot and data symbols for all N receive chains to channel estimator 250.

Channel estimates generated by channel estimator 250, in the illustrated embodiment, are used by MIMO decoder 240 to decode M uplink data streams and by MIMO precoder 260 to precode M downlink data streams.

The precoded downlink data streams, in the illustrated embodiment, are then processed by units 224A-N, 226A-N, 228A-N, and 230A-N, including resource mapping, adding guard symbols, serial-to parallel conversion, performing an inverse FFT, and adding the cyclic prefix. Subsequently, units 232A-N up-convert the data from the baseband rate and digital to analog converters (D/As) 234A-N convert the result for transmission via the antennas.

Various disclosed techniques address challenges when adding a large number of receive and transmit chains to a system, as in massive MIMO. In some embodiments, software defined radios are used to implement a massive MIMO system that is configurable, modular, meets I/O requirements for distributed processing, and supports real-time processing for large numbers of antennas.

Exemplary Massive MIMO System

Figure 3:
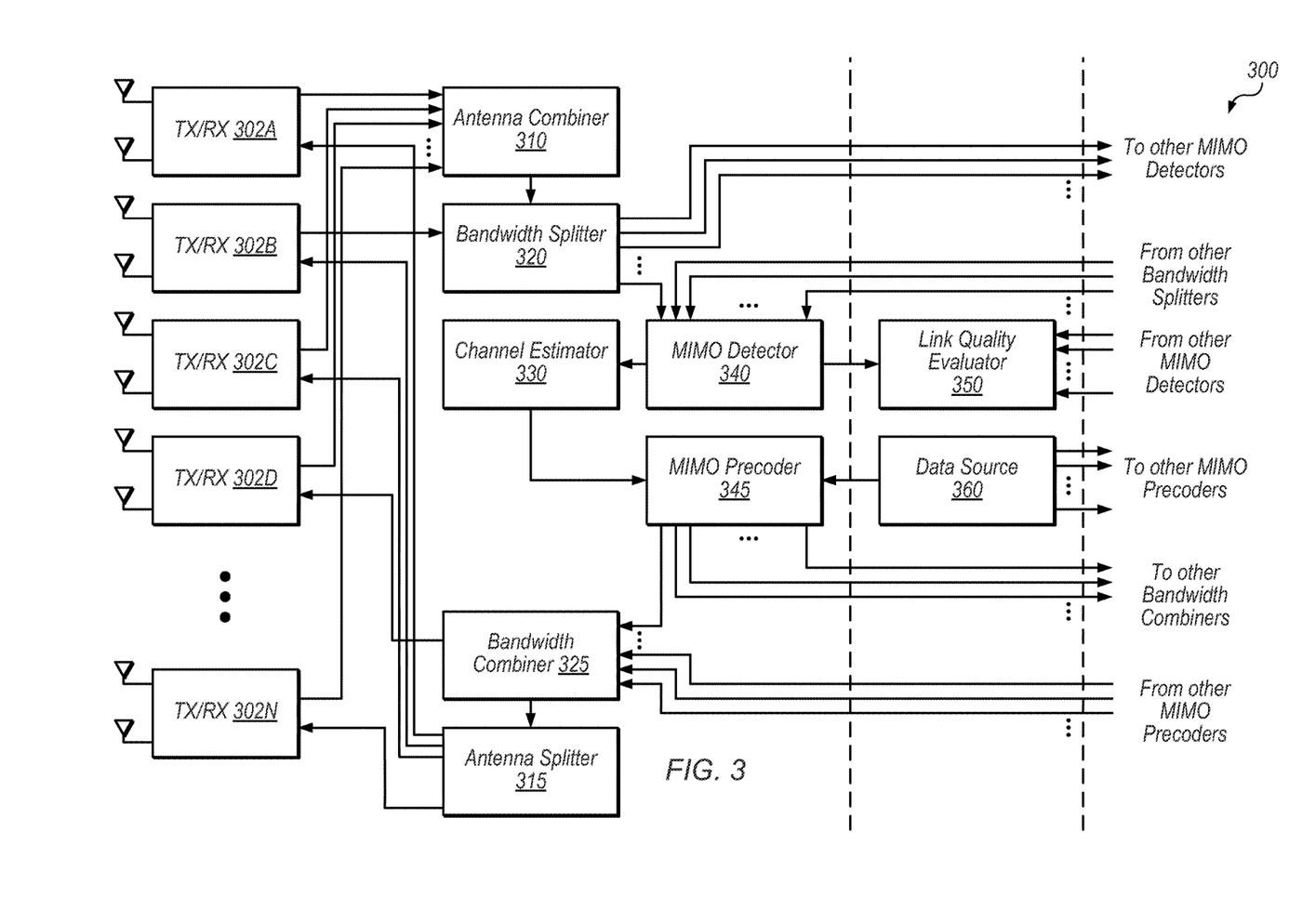
FIG. 3 is a block diagram illustrating a portion of an exemplary massive MIMO system configured to distribute processing, according to some embodiments.

FIG. 3 is a block diagram illustrating a subsystem of one embodiment of a massive MIMO system 300. System 300 may be included in base station 102, for example. In some embodiments, system 300 is configured to perform at least a portion of the processing described above with reference to FIG. 2 in a distributed manner. In the illustrated embodiment, the subsystem includes front-end TX/RX units 302A-N, antenna combiner 310, antenna splitter 315, bandwidth splitter 320, bandwidth combiner 325, channel estimator 330, MIMO detector 340, and MIMO precoder 345. In the illustrated embodiment, link quality evaluator 350 and data source 360 are included in a central control unit that is shared among multiple subsystems (as indicated by the vertical dashed lines, delineating units included in the central controller, according to this embodiment).

Other subsystems of system 300 (not shown), in the illustrated embodiment, include additional MIMO detectors, MIMO precoders, bandwidth splitters, and bandwidth combiners. For example, in an embodiment in which the subsystem of FIG. 3 includes eight TX/RXs 302 and the system includes six subsystems, 96 antennas may be used. MIMO processing, in the illustrated embodiment, is distributed among various processing elements. This may allow baseband processing to be partitioned across multiple FPGAs, for example. This may facilitate scaling of massive MIMO systems far beyond what a single centralized processing unit could achieve for real-time baseband processing.

TX/RX units 302A-N, in some embodiments, are included in software defined radio modules, which may also include processing elements configured or configurable to perform the functionality of various other units shown in FIG. 3. For example, TX/RX 302A and antenna combiner 310 may be implemented by the same SDR element.

For uplink symbols, as previously discussed with reference to FIG. 2, each TX/RX 302 may be configured to digitize the received RF signals, perform analog front-end calibration and time/frequency synchronization, remove the cyclic prefix (CP), and perform FFT OFDM demodulation and guard-band removal. This may result in frequency domain pilot and unequalized data symbol vectors, which is provided to antenna combiner 310 in the illustrated embodiment. Note that, at this point, the OFDM symbols may contain the superposition of transmitted signals by all users. For downlink symbols, each TX/RX 302 may be configured to perform ODFM processing as described above with reference to FIG. 2 for signals received from antenna splitter 315.

In one embodiment, antenna combiner 310, bandwidth splitter 320, MIMO precoder 345, bandwidth combiner 325, and antenna splitter 315 are each located on a different SDR element that also implements one of TX/RXs 302. In one embodiment, channel estimator 330 and MIMO detector 340 are located on another SDR element that also implements one of TX/RXs 302. In various embodiments, the various elements of FIG. 3 may be partitioned among various hardware elements configured to perform the disclosed functionality. The hardware elements may be programmable and/or include dedicated circuitry.

Antenna combiner 310, in the illustrated embodiment, is configured to receive the yet unequalized OFDM symbols from each TX/RX 302 and combines them into a signal sent to bandwidth splitter 320. This combines the signals from up to N antennas in the subsystem. Combining this information before further processing may allow the system to stay within throughput constraints and may reduce the number of peer-to-peer connections between SDRs, for example. In some embodiments, the number of antennas for which signals are combined by each antenna combiner 310 is dynamically configurable.

Bandwidth splitter 320, in the illustrated embodiment, is configured to split the received signals into separate bandwidth portions and send the portions to MIMO detectors in different subsystems. Thus, in the illustrated embodiment, processing is distributed across different processing elements that each process data for a different frequency band. Each bandwidth portion may include one or more subcarriers and the portions may or may not be non-overlapping. In some embodiments, the number of bandwidth portions and the size of each portion is configurable, e.g., based on the number of antennas, current number of users in communication, etc. In other embodiments, processing may be distributed among processing elements across different time slices in addition to and/or in place of splitting by frequency. In some embodiments, bandwidth splitter 320 is replaced with a time-slice splitter. Post-FTT subcarrier processing in OFDM may be inherently independent, allowing subsequent processing to be performed in parallel by different processing elements.

In the illustrated embodiment, the output of TX/RX 302B is provided directly to bandwidth splitter 320 and an output of bandwidth combiner 325 is provided directly to TX/RX 302D. In other embodiments, these outputs may be provided to antenna combiner 310 and antenna splitter 315 similarly to the other signals. In embodiments in which TX/RX 302B and bandwidth splitter 320 share the same SDR element and TX/RX 302D and bandwidth combiner 325 share the same SDR element, however, the illustrated coupling may conserve I/O resources.

MIMO detector 340, in the illustrated embodiment, is configured to use an estimated channel matrix (e.g., based on uplink pilot symbols) to cancel interference and detect frequency-domain symbols from each mobile device 106. As shown, in some embodiments MIMO detector 340 is configured to process signals in a given bandwidth from multiple subsystems of system 300. In the illustrated embodiment, MIMO detector 340 is configured to send the detected signals to channel estimator 330 and to link quality evaluator 350 (included in a central controller in some embodiments) for further processing.

Channel estimator 330, in the illustrated embodiment, is configured to perform channel estimation for its frequency portion for a number of mobile devices, e.g., to produce soft-bits (also referred to as log-likelihood ratios (LLRs)) and provide them to link quality evaluator 350 (coupling not shown). In some embodiments, multiple decoders are implemented, including a turbo decoder, for example.

For downlink symbols, data source 360, in test system embodiments, is configured to generate test data, which may be pseudo-random or may be explicitly specified for a particular test. In these embodiments, data source 360 may be located in a central control unit. In production systems, data source 360 may provide data from various networks to be transmitted to mobile devices 106.

MIMO precoder 345, in the illustrated embodiment, is configured to receive downlink data from data source 360 and precode the data based on channel estimates (e.g., estimated reciprocity calibration weights) from channel estimator 330. In some embodiments, the MIMO precoders in system 300 are configured to perform precoding on different frequency portions of the downlink data. In some embodiments (not shown), the MIMO precoders in system 300 are configured to perform precoding on different time portions of the downlink data.

Exemplary precoders, according to some embodiments, include maximum radio transmission (MRT) and zero forcing (ZF) precoders. In other embodiments, any of various appropriate precoding techniques may be implemented. Depending on the precoding technique implemented, varying amounts of processing for the precoding may be performed by at a central controller or distributed among MIMO precoders 345.

Bandwidth combiner 325, in the illustrated embodiment, is configured to combine signals at different bandwidths from multiple MIMO precoders and send the data to antenna splitter 315. This may result in a complete set of precoded data for transmission from the separately processed bandwidth portions. In other embodiments, bandwidth combiner 325 is configured to combine data corresponding to separately-processed time slices in place of or in addition to combining separately-processed frequency portions.

Antenna splitter 315, in the illustrated embodiment, is configured to split the received signal and provide the split signal to TX/RXs 302 for OFDM processing and transmission to mobile devices 106. The set of antennas to which antenna splitter 315 is configured to provide signals is dynamically configurable, in some embodiments (e.g., the number of antennas and/or the particular antennas in the set). Thus, in some embodiments, the set of processing elements configured to perform distributed processing for particular antennas and/or users is dynamically configurable.

Link quality evaluator 350, in the illustrated embodiment, is included in a central control unit and is configured to measure link quality using one or more of various metrics such as bit error rate (BER), error vector magnitude (EVM), and/or packet-error rate (PER).

In various embodiments, system 300 is highly configurable, e.g., based on user input and/or current operating conditions. In some embodiments, various disclosed configuration operations are performed automatically. In some embodiments, the number of processing elements used at a given time to perform distributed processing for a set of users or a set of antennas is configurable. In some embodiments, the number of antennas used to communicate with each UE is configurable and/or dynamically determined. In some embodiments, the processing elements configured to perform different functionality described above is configurable. For example, the antenna combiner function may be moved from one FPGA to another FPGA or performed by multiple FPGAs. In some embodiments, the routing of data between processing elements is configurable, e.g., to avoid malfunctioning antennas and/or processing elements. In various embodiments, system 300 is configured to adjust these configurable aspects dynamically based on current operating conditions. In some embodiments, system 300 includes a large number of antennas, e.g., more than 8. In some embodiments, for example, system 300 includes 16, 32, 64, 100, 128, 256, or more antennas. In some embodiments, components of system 300 are modular such that the number of antennas may be increased by adding additional components.

In some embodiments, a software library is provided with system 300 and is configured with example test scenarios for configuring system 300. In some embodiments, a graphical programming language such as LabVIEW is used to configure programmable hardware devices in system 300. Thus, various functionality described herein may be configured using a graphical programming interface.

Exemplary high-level system parameters, according to some embodiments, include a system bandwidth of 20 MHz, a carrier frequency of 3.7 GHz, a sampling rate of 30.72 MS/s, and FFT size of 2048, 1200 used subcarriers, a 0.5 ms slot time, a 1 ms subframe time, a 10 ms frame time, and 100 antennas. These parameters are exemplary only and are not intended to limit the scope of the present disclosure. In some embodiments, the parameters are user configurable and/or are dynamically configurable by the system itself.

In the illustrated embodiment, bandwidth splitter 320 is configured to separate and provide bandwidth portions of the incoming signals from multiple antennas in order to distribute processing load. In other embodiments, the incoming signals maybe split in other dimensions in addition to and/or in place of the frequency dimension. Processing for downlink signals may be similarly distributed. Thus, in various embodiments, the disclosed system is highly configurable and provides high-performance distributed processing to meet real-time performance requirements for massive MIMO systems.

Exemplary System Parameters

Figure 4:
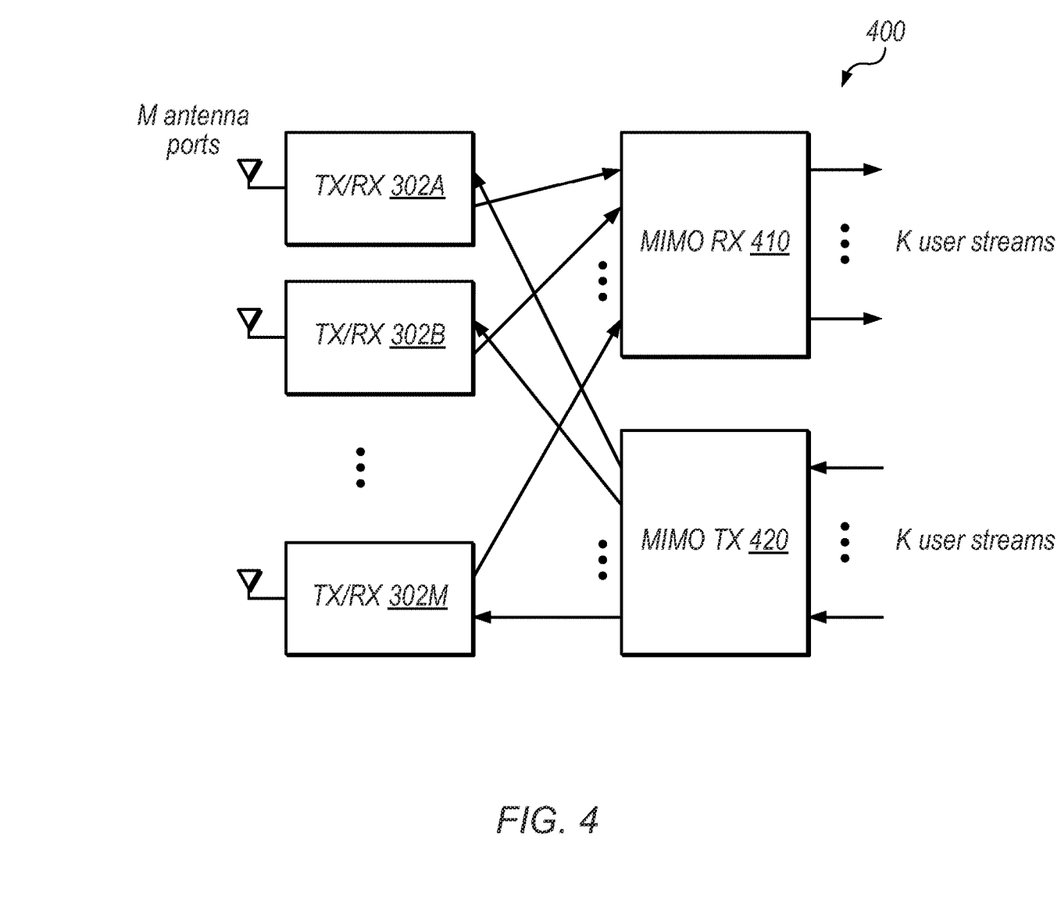
FIG. 4 is a block diagram illustrating exemplary MIMO scaling parameters, according to some embodiments.

FIG. 4 is a block diagram illustrating a simplified massive MIMO system 400. In the illustrated configuration, system 400 uses M antenna ports for K user streams. System 400 may include a greater number of antenna ports than M and be configurable to process a greater number of antenna streams than N, and thus may process for given values of M and N based on current operating conditions. In other embodiments, the disclosed techniques may be used to quickly design and/or prototype a particular system for fixed values of M and N. Each user stream K is a spatial stream of data. Each spatial stream that may include data from multiple users that are allocated different frequencies within the same spatial stream, in some embodiments. Further, a given user may be allocated multiple spatial streams, in some embodiments. Therefore, the number of users communicating with the system may or may not correspond to K.

In some embodiments, MIMO RX 410 is configured to perform the functionality discussed above with reference to channel estimator 330, MIMO detector 340, link quality evaluator 350, etc. In some embodiments, MIMO TX 420 is configured to perform the functionality discussed above with reference to MIMO precoder 345. In some embodiments, elements 410 and 420 are scalable and configurable for communications using a wide variety of M and K values and/or MIMO algorithms.

Exemplary Scaling of Utilized Processing Elements

Figure 5:
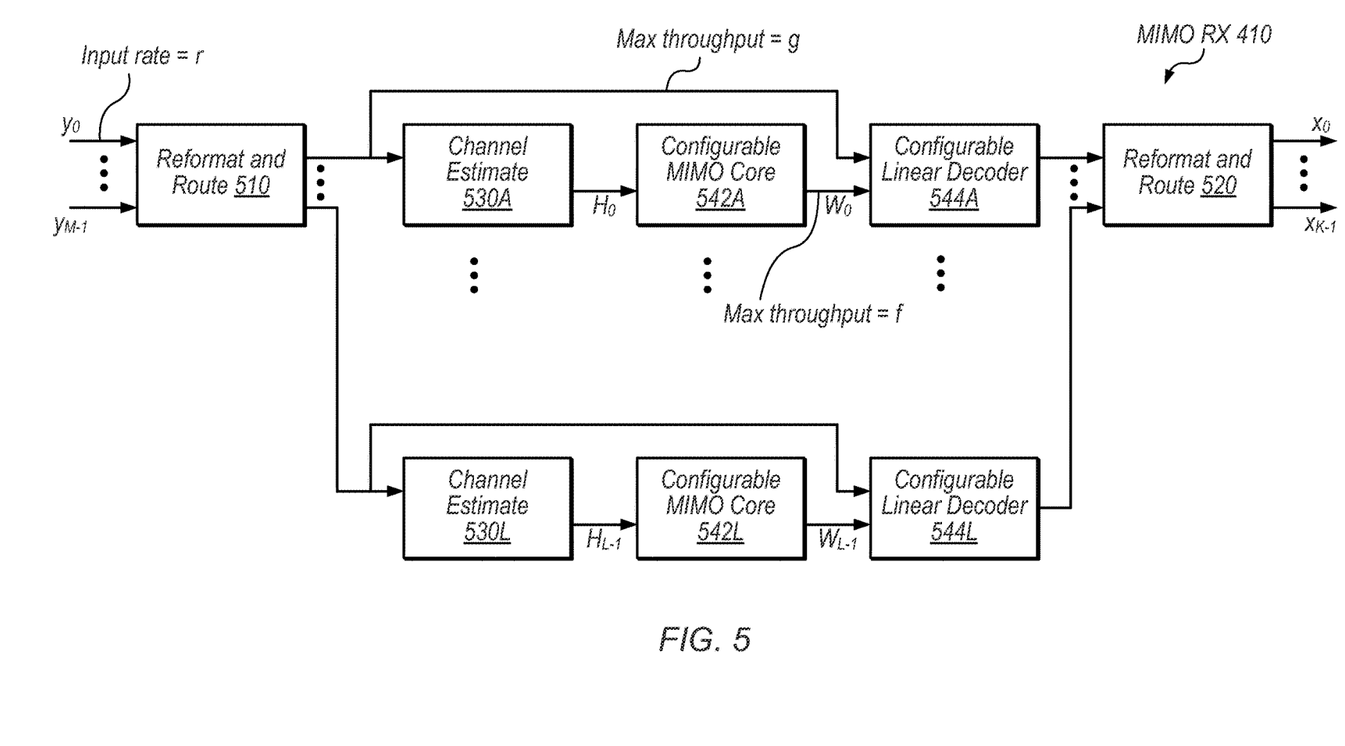
FIG. 5 is a block diagram illustrating exemplary scalable and configurable MIMO RX circuitry, according to some embodiments.

FIG. 5 is a block diagram illustrating scalable MIMO RX circuitry 410, according to some embodiments. In the illustrated embodiment, circuitry 410 includes reformat and route circuitry 510 and 520, channel estimate processing elements 530A-530L, configurable MIMO cores 542A-542L, and configurable linear decoders 544A-544L. In the illustrated embodiment, circuitry 500 is configured to receive M antenna input data streams $y_0$ through $y_{M-1}$ at rate r and generate K user streams $x_0$ through $x_{K-1}$ at rate r. Although the rate r of the input data streams and the user streams is the same in the illustrated embodiment, these rates may be different in various embodiments. In some embodiments, the amount of circuitry used for MIMO RX processing is configurable, e.g., by selecting the number of parallel receive chains L used for processing based on various parameters. Unselected circuitry may be powered down or clock gated to reduce power consumption.

Reformat and route circuitry 510 and 520, in some embodiments, are configured to perform the functionality of elements 310, 315, 320, and 325 of FIG. 3. This may include splitting input streams into different bandwidth and/or time portions for separate processing in parallel and combining processed portions for further processing or transmission. For example, $y_0$ may be split into multiple portions indexed 0 through L-1 and $x_0$ may include multiple portions indexed 0 through L-1 that are generated by different chains.

Channel estimators 530A-530L may be configured similarly to element 330 of FIG. 3, in some embodiments. In the illustrated embodiment, each channel estimate unit 530 is configured to generate a channel matrix H and transmit the channel matrix to a corresponding configurable MIMO core 542. The channel matrix H may be used to model the system, e.g., as discussed above with reference to equation (1). H may be determined based on known pilot sequences in received signals, in some embodiments.

Configurable MIMO cores 542A-542L, in the illustrated embodiment, are each configured to generate a matrix W to be multiplied by the received vector y to generate an estimated x vector. In some embodiments, configurable MIMO cores 542 are configured to implement multiple MIMO algorithms and are configured to switch between algorithms on the fly, e.g., on a per-symbol basis.

Configurable linear decoders 544A-544L, in the illustrated embodiment, are configured to multiply the received matrix W by a vector of input data to generate user data, which is then reformatted and routed by block 520. In some embodiments, linear decoders 544 are configured to operate on different matrix sizes, e.g., based on the current M, L, and/or K values.

In the illustrated embodiment, the maximum throughput from reformat and route circuitry 510 is represented using g and the maximum throughput from a given configurable MIMO core 542 to a corresponding configurable linear decoder 544 is represented using f. In some embodiments, these throughput limits are used as a parameter to select the amount of circuitry used for MIMO RX processing, e.g., by adjusting the number of parallel MIMO processing chains L. In various embodiments, threshold throughputs may be imposed by the processing capacity of a given processing element, bandwidth restraints of interconnects between processing elements, etc.

In some embodiments, the total input rate is M times r. In some embodiments, the total input throughput is M times r times $B_{in}$ where $B_{in}$ is the number of bytes per input sample. In some embodiments, circuitry 410 is configured to select L such that:

$$L \geq \frac{MrB_{in}}{g} \quad (3)$$

which may provide sufficient throughput and/or processing capacity in various operating conditions.

In some embodiments, the total output rate is K times r. In some embodiments, the total output throughput is K times r times $B_{out}$ where $B_{out}$ is the number of bytes per output sample. In some embodiments, the number of bytes per entry in matrix W is Bw the matrix throughput for a given matrix W is:

$$\frac{MKr}{L}B_W \quad (4)$$

In some embodiments, circuitry 410 is configured to select L such that:

$$L \geq \frac{MkrB_W}{f} \quad (5)$$

This may provide sufficient throughput and/or processing capacity for various values of M and K. If L is larger than the minimum value that satisfies equation (3) and (5), reducing L to a smaller value (and thus utilizing a smaller number of processing elements) may reduce power consumption, in various embodiments. For example, unused MIMO RX chains may be powered down or clock gated when L is decreased below the maximum available L.

Consider, for example, a situation in which M is 128, r is 16.8 megasamples per second, and $B_{in}$ is 4 bytes per sample. In this example, $MrB_{in}$ is 8.6 GB/s. If K is 12, $B_{out}$ is 1 byte per sample, and Bw is 6.25 bytes per sample, then the matrix throughput for a given W is 40.3 GB/s based on equation (4).

In this example, if the max throughput g is 2.4 GB/s and the max throughput f is $KW_0$, then the smallest L that satisfies equations (3) and (5) is four.

Consider, as another example, a situation in which M is less than 32 and K is less than 12. In this example, assuming that r is 16.8 megasamples per second, $B_{in}$ is 4 bytes per sample $B_{out}$ is 1 byte per sample, and Bw is 50 bits per sample, then L may be set to one while still satisfying equations (3) and (5) and a single MIMO RX processing chain may be used. In some embodiments with 128 antennas, the maximum L is four. In other embodiments, the maximum L may be larger or smaller. In still other embodiments, L may be fixed and may be determined for a particular designed based on the parameters discussed above. In FPGA embodiments, for example, L may be selected to meet design requirements while efficiently utilizing programmable circuitry, leaving remaining programmable circuitry available for other functionality.

Exemplary Linear Decoder

Figure 6:
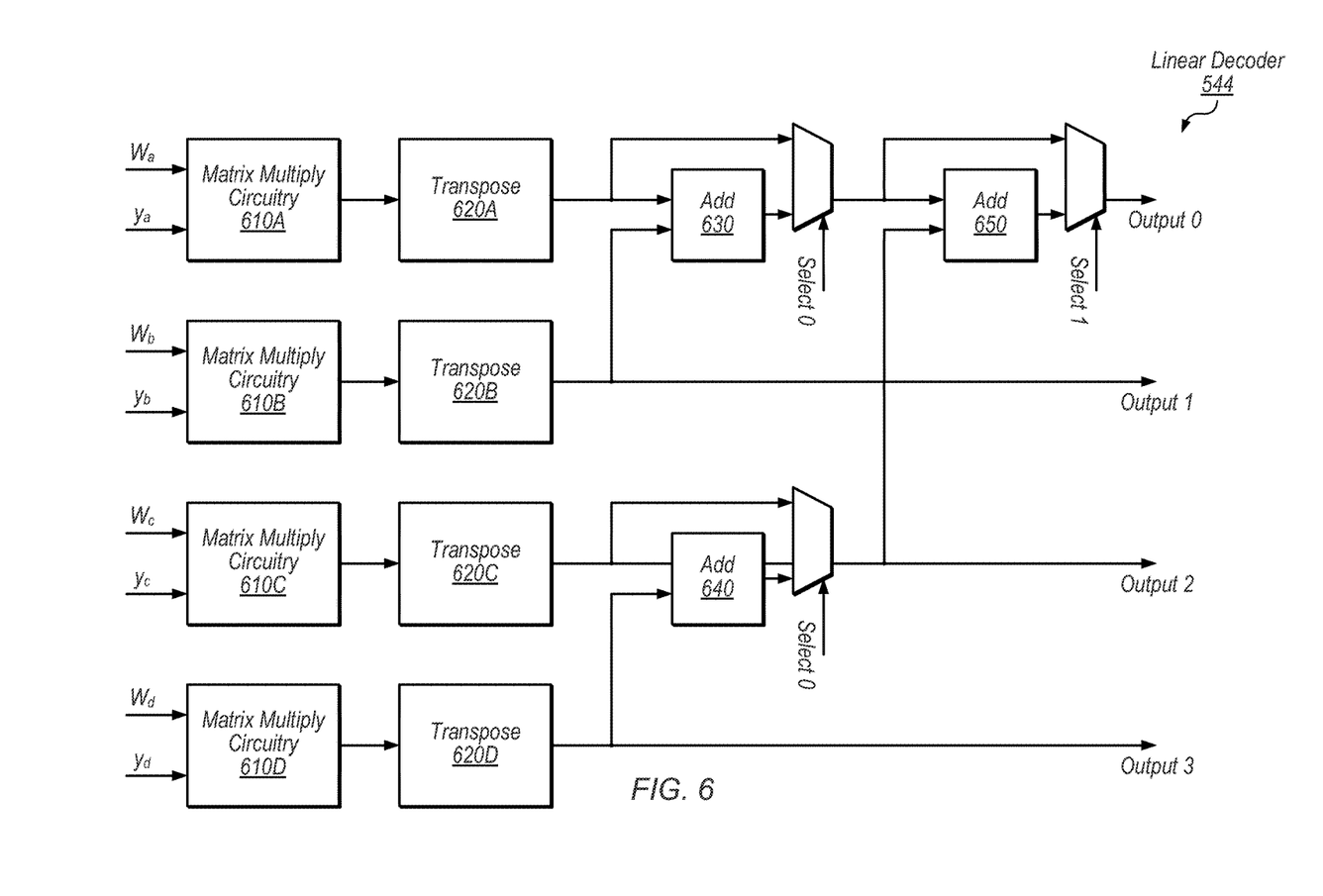
FIG. 6 is a block diagram illustrating an exemplary linear decoder processing element, according to some embodiments.

FIG. 6 is a block diagram illustrating a linear decoder 544, according to some embodiments. In the illustrated embodiment, linear decoder 544 is configured to perform either: a [128×12] by [128×1] vector multiply, two [64×12]×[64×1] matrix-vector multiplies, or four [32×12]×[32×1] matrix-vector multiplies, based on the values of the select 0 and select 1 signals. In some embodiments, system 400 is configured to generate these select signals based on M. For example, in these embodiments, if M is less than 32, then system 400 is configured to pack four 32×K submatrices into each configurable linear decoder 544 and perform four multiplies. In these embodiments, if M is between 32 and 64, then system 400 is configured to pack two 64×K submatrices into each configurable linear decoder and perform two multiplies. The granularity 32 is given for illustrative purposes, but in other embodiments, larger or smaller matrices may be used, allowing for any of various appropriate granularities of processing. For example, in the illustrated embodiments, L is one for numbers of antennas smaller than 32, but in other embodiments each chain may include less circuitry and L may be one only for numbers of antennas smaller than 16, 8, etc. In some embodiments, packing matrices may increase the decoder output rate but maintain the overall system throughput $KrB_{out}$. In some embodiments, the matrices may be packed to multiplex data from different physical antennas and/or padded with zeros to achieve the desired matrix sizes for a particular mode of operation.

In the illustrated embodiment, linear decoder 544 includes matrix multiply circuitry 610A-610B, transpose units 620, add circuitry 630, 640, and 650, and three multiplexers controlled by the select 0 and select 1 signals. In other embodiments, any of various appropriate numbers of instances of matrix multiply circuitry 610 may be included.

Each instance of matrix multiply circuitry 610, in the illustrated embodiment, is configured to receive a portion of an input matrix W (which may be an independent matrix or a portion of a larger matrix) and portion of input vector y and perform matrix-vector multiplication of the received portions.

Transpose units 620, in the illustrated embodiment, are configured to reorder data for subsequent mapping and decoding. In some embodiments, transpose units 620 may be omitted, e.g., depending on mapping and decoding configuration.

The illustrated instances of add circuitry 630, 640, and 650, in the illustrated embodiment, are configured, depending on L, to add received multiplication results to stitch together a larger matrix-vector multiply from the smaller multiplications. In the illustrated embodiment, the multiplexers are configured to bypass all results of add circuitry 630, 640, and 650 in order to perform four multiplies, bypass add circuitry 650 in order to perform two multiplies, and not to bypass any of add circuitry 630, 640, or 650 in order to perform a single matrix-vector multiply.

The matrix packing operations may facilitate processing for varying M values using different numbers L of parallel processing chains, in various embodiments.

Exemplary Configurable MIMO RX

Figure 7:
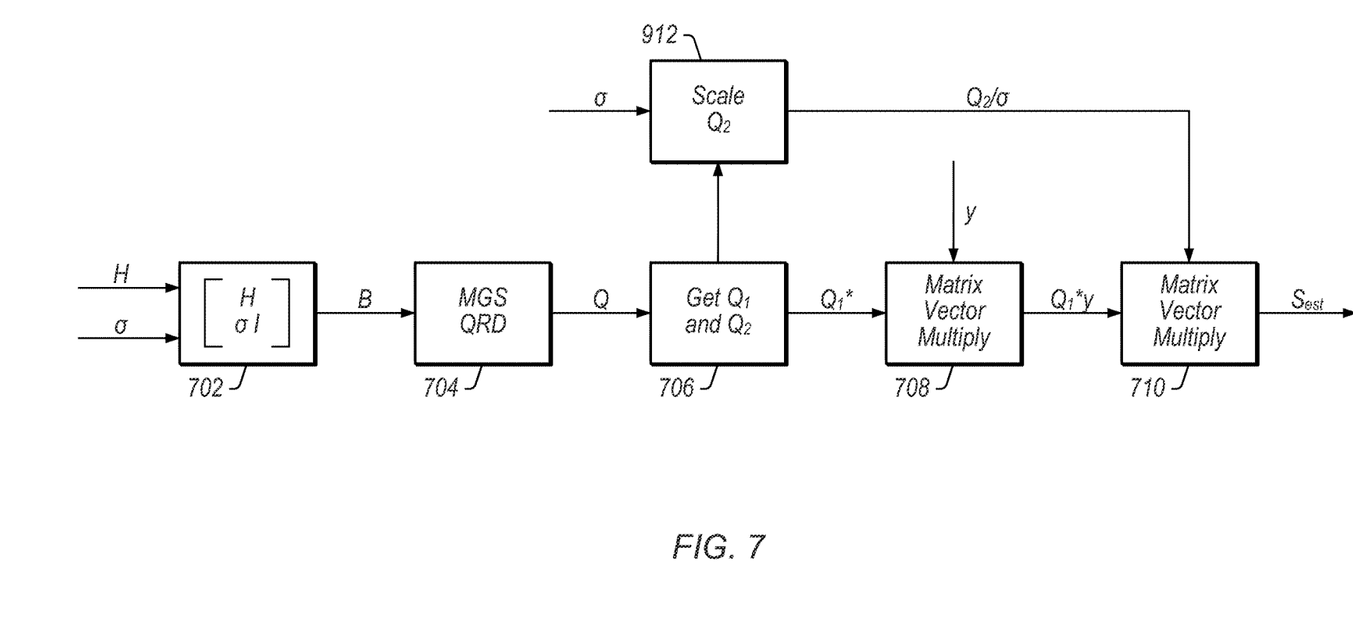
FIG. 7 is a block diagram illustrating an exemplary QR decomposition (QRD) technique for signal estimation, according to some embodiments.

FIG. 7 is a diagram illustrating use of a Modified Gram-Schmidt (MGS) technique to generate an estimated signal with respect to an observed symbol y on a noisy channel. U.S. patent application Ser. No. 13/865,357, filed Apr. 18, 2013 describes exemplary techniques for using the Modified Gram-Schmidt algorithm to perform QR decomposition for MMSE. In some embodiments, configurable MIMO core 542 and/or configurable linear decoder 544A are configured to perform the operations illustrated in FIG. 7.

In the illustrated embodiment, MIMO RX 410 is configured to receive a channel matrix H and a scaling factor σ, as shown being provided to block 702. For MMSE techniques, sigma indicates the noise variance for MMSE. As 702 also indicates, an identity matrix may be scaled by the scaling factor σ, thereby generating a scaled identity matrix σI, and the channel matrix H may be extended with the scaled identity matrix σI, thereby generating extended channel matrix B. Block 704 may be configured to compute matrix Q, based on the extended matrix B using the MGS process.

Block 706, may be configured to partition matrix Q into constituent matrices $Q_1$ and matrix $Q_2$, i.e., matrix Q may be divided or separated into matrix $Q_1$ and matrix $Q_2$, which may then be stored, e.g., in a memory or register of the circuit. In 912, matrix $Q_2$ may be scaled by scaling factor σ, thereby computing $Q_{2/\sigma}$, as shown.

Block 708 may be configured to compute, based on matrix $Q_1$ from 706, Hermitian conjugate transpose (matrix) $Q_1^*$ and multiply the result by the vector y (observed signal). Block 710, may be configured to multiply scaled matrix $Q_{2/\sigma}$ by the product ($Q_1^*$y), resulting in estimated signal $S_{est}$. In other words, the estimated signal $S_{est}$ may be computed based on $Q_1$, $Q_{2/\sigma}$, and the observed signal y. The estimated signal $S_{est}$ may be output and/or stored, e.g., by processing by reformat and route circuitry 520.

In some elements, configurable MIMO core 542 is configured to implement multiple MIMO algorithms, including MMSE, and is configurable to switch between algorithms during operation, e.g., at a per-symbol granularity.

Figure 8:
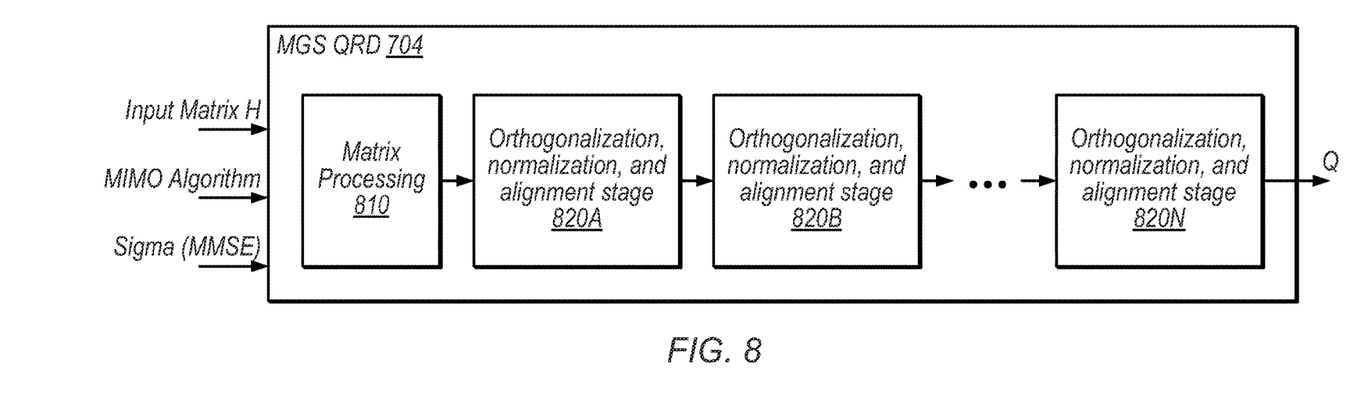
FIG. 8 is a block diagram illustrating and exemplary Modified Gram-Schmidt (MGS) QRD processing element that is configurable to implement multiple MIMO signal estimation techniques, according to some embodiments.

FIG. 8 is a block diagram illustrating exemplary components of MGS QRD 704 (which may be implemented by configurable MIMO core 542), according to some embodiments. In the illustrated embodiment, MGS QRD 704 includes matrix processing unit 810 and multiple orthogonalization, normalization, and alignment (ONA) stages 820A-820N. In the illustrated embodiment, MIMO core 542 is configured to implement multiple different MIMO algorithms, such as, without limitation, minimum mean square error (MMSE), zero forcing (ZF), and maximal-ratio combining (MRC). In some embodiments, MIMO core 542 is configured to switch between techniques on a per-symbol granularity. For example, MIMO core 542 may use ZF for one OFDM symbol and MMSE for the next OFDM symbol (note that the disclosed techniques are not limited to OFDM, but may be implemented in various coding systems). In some embodiments, any of various appropriate MIMO techniques may be implemented in addition to and/or in place of MMSE, ZF, and MRC.

In the illustrated embodiment, MGS QRD 704 is configured to receive input matrix H and generate output matrix Q (eventually used to generate $S_{est}$, as shown in FIG. 7) based on the MIMO algorithm and sigma inputs. In some embodiments, a given matrix W of FIG. 5 corresponds to $Q_2Q_1'$/sigma where W is the output of the QR decomposition. Matrix processing block 810, in the illustrated embodiment, may be configured to implement one or more transposes to correctly format data, etc.

QR decomposition generally involves normalization and orthogonalization processes which are applied iteratively to column vectors of a matrix. In some embodiments, these processes may be determined using a systolic array of processing elements. In the illustrated embodiment, ONA stages 820A-820N are configured to receive an input matrix and vector, normalize the input vector, perform alignment, and perform orthogonalization to generate an output matrix and vector. Further details regarding ONS stages 820 are discussed below with reference to FIG. 9.

In some embodiments, for ZF, MIMO core 542 is configured to use a value for sigma that is small enough to reduce effects of regularization but not small enough to make normalization ill-conditioned. One example value for sigma for ZF would be 0.00390625, in some embodiments. Therefore, in some embodiments, MIMO core 542 is configured to use at least a portion of the circuitry used for MMSE for ZF techniques, while asserting a pre-determined small value for sigma.

In some embodiments, for MRC, MIMO core 542 is configured to bypass orthogonalization processing elements in each stage 720, as discussed in further detail below with reference to FIG. 8. Therefore, in some embodiments, MIMO core 542 is configured to use at least a portion of the circuitry used for MMSE for MRC, while bypassing orthogonalization circuitry.

Figure 9:
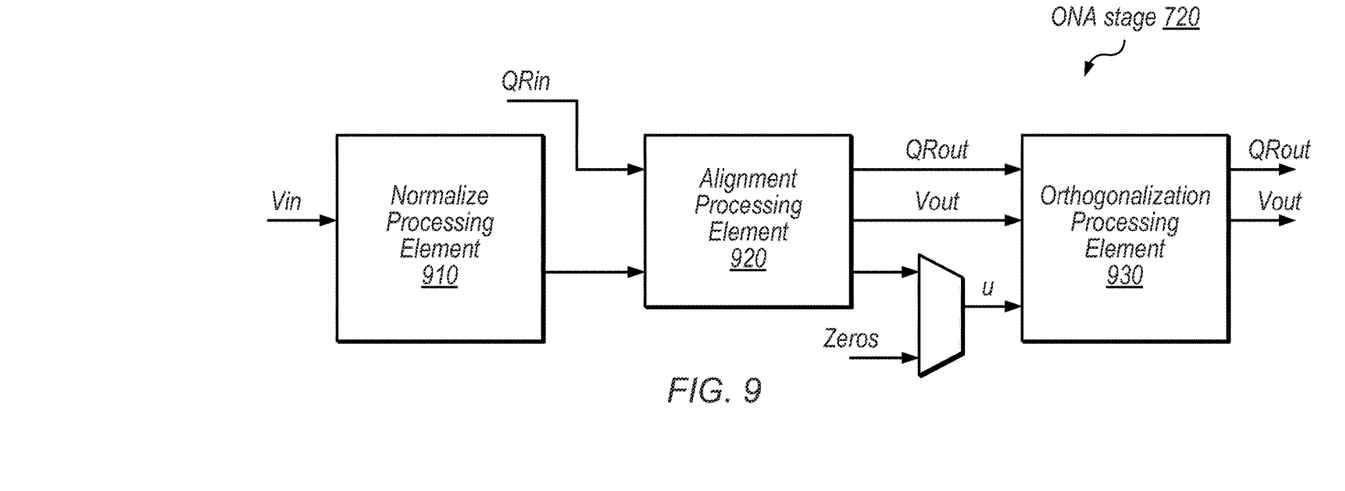
FIG. 9 is a block diagram of an orthogonalization, normalization, and alignment stage utilized in the processing element of FIG. 8, according to some embodiments.

FIG. 9 is a block diagram illustrating exemplary circuitry included in an ONA stage 720, according to some embodiments. In the illustrated embodiment, ONA stage 720 includes normalize processing element 910, alignment processing element 920, orthogonalization processing element 930, and a multiplexer.

Normalize processing element, in some embodiments, is configured to normalize the input vector and provide the normalized vector to alignment processing element 920. The input vector $V_{in}$ may be a column of input matrix H, in some embodiments. The QRin and QRout matrices may be generated as described in the Ser. No. 13/865,357 patent application, for example.

Alignment, processing element, in the illustrated embodiment, is configured to align the QR input matrix to adjust for latency of the normalize operation and insert normalized vectors into the input matrix (e.g., in embodiments in which the operations are performed in-place).

Orthogonalization processing element 930, in the illustrated embodiment, is configured to perform orthogonalization to generate output matrix QRout, based on the outputs from alignment processing element 920. In the illustrated embodiment, the multiplexer is configured to replace an orthogonalization vector u with zeros when an MRC algorithm is implemented, effectively bypassing orthogonalization. In other embodiments, any of various appropriate bypassing techniques may be implemented, and orthogonalization processing element 930 may be powered-down or clock gated during MRC processing, for example. The disclosed techniques may allow dynamic switching between MIMO signal detection algorithms and re-use of circuitry for various MIMO algorithms.

Exemplary Method

Figure 10:
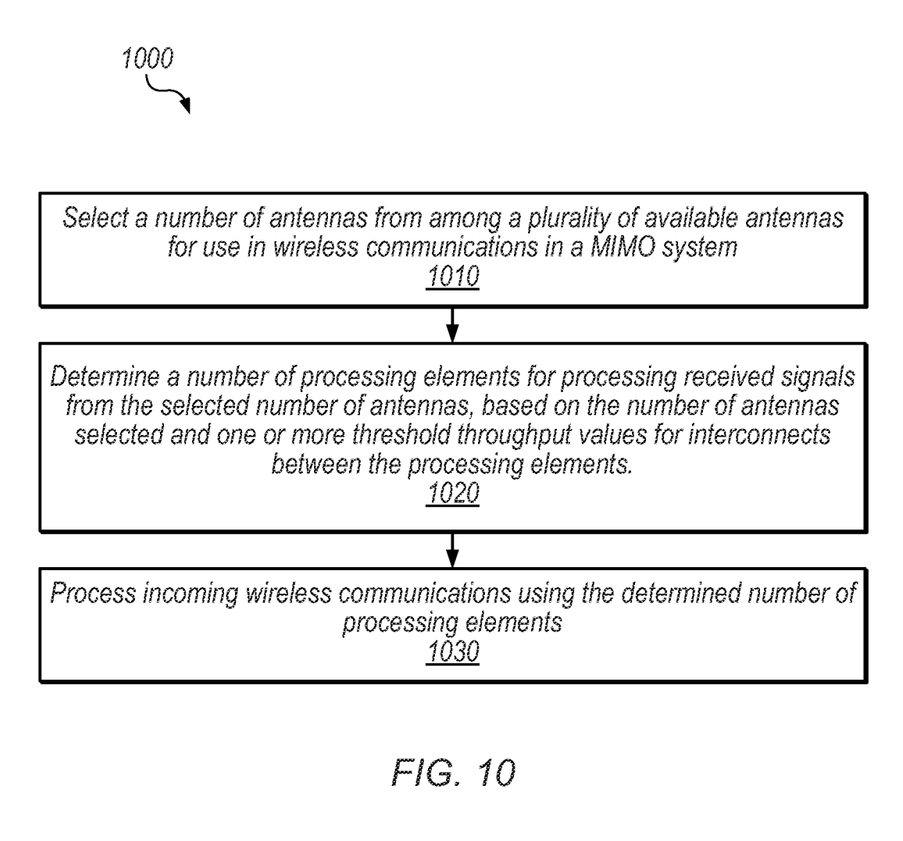
FIG. 10 is a flow diagram illustrating a method for scaling the number of MIMO RX processing elements, according to some embodiments.

FIG. 10 is a flow diagram illustrating a method 1010 for scaling the number of MIMO RX processing elements, according to some embodiments. The method shown in FIG. 10 may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed as desired. Flow begins at 1010.

At 1010, a base station selects a number of antennas from among a plurality of available antennas for use in MIMO wireless communications. For example, the system may include 128 antennas but the base station may select to use only 64 antennas during a given time interval based on current operating conditions. The decision of how many antennas to use may be based on user input, a number of users currently in a cell, wireless signal conditions, bandwidth of current communications, desired testing conditions, etc. The base station may select different numbers of antennas at different times, e.g., a larger number during peak communications intervals and a smaller number during trough intervals.

At 1020, the base station determines a number of processing elements for processing received signals from the selected number of antennas. In the illustrated embodiment, this is based on the number of antennas selected and one or more threshold throughput values (e.g., g and/or f of FIG. 5). In some embodiments, this determination may be based on any of various appropriate parameters in addition to and/or in place of the parameters shown in FIG. 10, including without limitation: the processing capacity of each processing element, the amount of data per sample or entry for various information, a sampling rate, the number of spatial streams, number of users, etc. As shown in FIG. 5, determining the number of processing elements may include determining a number of parallel receive chains for MIMO RX. In some embodiments, each receive chain includes a configurable MIMO core and a configurable linear decoder.

At 1030, the base station processes incoming wireless communications using the determined number of processing elements. This may include applying a MIMO signal estimation techniques such as MMSE, ZF, or MRC and decoding received data streams. After processing, the decoded data from the determined number of processing elements may be reformatted and routed and transmitted to appropriate destinations (e.g., via another network such as a carrier network, the Internet, etc.).

In some embodiments, the base station dynamically switches between different MIMO signal estimation techniques, e.g., based on user input, operating conditions, or any of various appropriate parameters.

The disclosed techniques may, in some embodiments, facilitate testing of MIMO base stations, reduce power consumption during MIMO communications, allow for flexibility in capacity, allow for flexibility in MIMO signal estimation, allow routing around defective processing elements or antennas, etc. In some embodiments, the base station may also be dynamically or statically customized for a wide variety of operating conditions and/or research needs and may be configured for real-time processing.

Embodiments of the present disclosure may be realized in any of various forms. For example, in some embodiments, the present invention may be realized as a computer-implemented method, a computer-readable memory medium, or a computer system. In other embodiments, the present invention may be realized using one or more custom-designed hardware devices such as ASICs. In other embodiments, the present invention may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, an apparatus (e.g., a base station) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An apparatus, comprising:
a plurality of antennas;
a plurality of processing elements coupled to the plurality of antennas and configured to perform processing for received wireless communications via the plurality of antennas;
one or more interconnects configured to couple ones of the plurality of processing elements with other ones of the plurality of processing elements;
wherein the apparatus is configured to combine signals received by multiple antennas of the plurality of antennas;
wherein, for at least a subset of the processing elements, each processing element is configured to operate on a different portion of the combined signal in parallel, wherein each portion includes signals from multiple antennas of the plurality of antennas; and
wherein the apparatus is configured to operate in:
a first mode in which a first number of the plurality of processing elements process received wireless communications from a first number of the plurality of antennas; and
a second mode in which a second number of the plurality of processing elements that is smaller than the first number of processing elements process received wireless communications from a second number of the plurality of antennas that is smaller than the first number of antennas.

2. The apparatus of claim 1, wherein the apparatus is configured to determine the second number of processing elements for use in the second mode based on at least:

the value of the second number of antennas;
a sampling rate for signals from the second number of antennas;
an amount of data per sample for signals from the second number of antennas; and
one or more threshold throughput values for the one or more interconnects.

3. The apparatus of claim 2, wherein the apparatus is configured to determine the second number of processing elements based on a product of: the value of the second number of antennas, the sampling rate, and the amount of data per sample, divided by one of the one or more threshold throughput values.

4. The apparatus of claim 1, wherein the apparatus is configured to determine the second number of processing elements for use in the second mode based on at least:
the value of the second number of antennas;
a number of separate spatial streams used for communication via the second number of antennas;
one or more threshold throughput values for the one or more interconnects;
an amount of data per sample for a generated matrix; and
an output rate for the separate spatial streams after processing based on the generated matrix.

5. The apparatus of claim 4, wherein the apparatus is configured to determine the second number of processing elements based on a product of: the value of the second number of antennas, the number of separate spatial streams, the output rate, and the amount of data per sample, divided by one of the one or more threshold throughput values.

6. The apparatus of claim 1,
wherein a portion of the plurality of processing elements are linear decoders;
wherein, in the first mode, a particular linear decoder of the plurality of processing elements includes multiplication circuitry configured to process a single input matrix using; and
wherein, in the second mode, the multiplication circuitry is configured to process a plurality of input matrices.

7. The apparatus of claim 6, further comprising:
adder tree circuitry configured to add multiple smaller matrix multiplication results to process the single input matrix in the first mode and bypass addition of smaller matrix multiplication results in the second mode.

8. The apparatus of claim 1, wherein the apparatus is configured to process a first symbol of a received wireless signal according to a first signal estimation technique and a second, immediately subsequent symbol of the received wireless signal according to a second, different signal estimation technique.

9. The apparatus of claim 8, wherein the first and second techniques are different signal estimation techniques selected from the group consisting of: minimum mean square error (MMSE), zero forcing (ZF), and maximal-ratio combining (MRC).

10. A method, comprising:
selecting a number of antennas from among a plurality of available antennas for use in wireless communications in a multiple-input multiple-output (MIMO) system;
determining a number of processing elements for processing received signals from the selected number of antennas, wherein for at least a subset of the processing elements, each processing element is configured to operate on a different portion of combined signal from the selected antennas in parallel, wherein each portion includes signals from multiple antennas; and
processing, by the determined number of processing elements, incoming wireless communications;
wherein the determining is performed based on:
the number of antennas selected; and
one or more threshold throughput values for one or more interconnects between the processing elements.

11. The method of claim 10, wherein the determining is further performed based on:
a number of separate spatial streams used for communication via the number of antennas selected.

12. The method of claim 11, wherein the determining is based on a product of: the value of the number of antennas selected, the number of separate spatial streams, an output rate, and an amount of data per sample, divided by one of the one or more threshold throughput values.

13. The method of claim 10, wherein the determining is based on a product of: the value of the number of antennas selected, a sampling rate for signals from the selected number of antennas, and an amount of data per sample, divided by one of the one or more threshold throughput values.

14. The method of claim 10, further comprising:
selecting a processing mode for one of the number of processing elements, wherein the selecting is performed from among a first mode in which multiplication circuitry in the processing element is configured to process a single input matrix and a second mode in which the multiplication circuitry is configured to process a plurality of input matrices.

15. The method of claim 14, further comprising adding results of smaller matrix multiplications to generate a multiplication result for the single input matrix in the first mode.

16. The method of claim 10, further comprising:
increasing the number of processing elements in response to a change in operating conditions.

17. The method of claim 10, further comprising:
processing different symbols of an incoming wireless signal according to different signal estimation techniques.

18. The method of claim 17, wherein the different signal estimation techniques include at least one of: minimum mean square error (MMSE), zero forcing (ZF), or maximal-ratio combining (MRC).

19. The method of claim 17, further comprising:
bypassing orthogonalization circuitry used for one or more other signal estimation techniques when processing the incoming wireless communications according to a maximal-ratio combining signal estimate technique.

20. The method of claim 17, further comprising:
asserting a pre-determined scaling factor when processing the incoming wireless communications according to a zero forcing signal estimate technique.

* * * * *